(12) United States Patent
Ugon et al.

(10) Patent No.: US 6,839,849 B1
(45) Date of Patent: Jan. 4, 2005

(54) SMART INTEGRATED CIRCUIT

(75) Inventors: Michel Ugon, Maurepas (FR); Yvon Gressus, Les Clayes Sous Bois (FR); Christoph Siegelin, Paris (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/623,133

(22) PCT Filed: Dec. 23, 1999

(86) PCT No.: PCT/FR99/03275
§ 371 (c)(1),
(2), (4) Date: Aug. 28, 2000

(87) PCT Pub. No.: WO00/39660
PCT Pub. Date: Jul. 6, 2000

(30) Foreign Application Priority Data

Dec. 28, 1998 (FR) .............................. 98 16485

(51) Int. Cl.[7] .............................................. G06F 13/00
(52) U.S. Cl. ...................................... 713/200; 713/201
(58) Field of Search .................................. 713/200, 201

(56) References Cited

U.S. PATENT DOCUMENTS 4,932,053 A 6/1990 Fruhauf et al.
5,594,493 A * 1/1997 Nemirofsky .................. 725/23
5,796,083 A * 8/1998 Kenneth et al. ............. 235/380
5,815,577 A * 9/1998 Clark ........................... 380/52

FOREIGN PATENT DOCUMENTS

| EP | 0 448 262 A | 9/1991 |
| WO | WO 97 04376 A | 2/1997 |
| WO | WO 97 33217 A | 9/1997 |

* cited by examiner

*Primary Examiner*—Thomas R. Peeso
(74) *Attorney, Agent, or Firm*—Miles & Stockbridge P.C.; Edward J. Kondracki

(57) ABSTRACT

The present invention relates to a smart integrated circuit.

This smart integrated circuit is characterized in that it has a main processor (1) and an operating system executing a main program (P1) for constituting a main task-performing process, at least one secondary processor (2) capable of concurrently executing at least one secondary program (P2) for constituting at least one task-performing process, power supply circuits (6) common to the processors and means for ensuring that the secondary processor or processors with similar power and different operating signatures are executed concurrently with the main process by continuously or intermittently inducing, in the power supply circuits, power disturbances that are superimposed on those of the main process so as to produce a continuous or intermittent scrambling.

26 Claims, 5 Drawing Sheets

SMART INTEGRATED CIRCUIT

FIELD OF THE INVENTION

The invention relates to integrated circuits and, more particularly, to a smart integrated circuit.

DESCRIPTION OF RELATED ART

It is known that microprocessors, microcomputers or smart integrated circuits sequentially execute the instructions of a program stored in a memory, in sync with one or more timing signals referenced to clock signals supplied to the microprocessor, microcomputer or integrated circuit either internally or externally. A smart integrated circuit means an integrated circuit comprising specific circuits limited to the execution of a limited number of instructions or functionalities for which they have been specifically developed.

It has proven possible to trace the various phases of the execution of this program over time since the execution of the instructions occurs sequentially in accordance with a process predetermined by this program, generally in sync with the clock signals that normally time the processor. In essence, any program involves a sequence of instructions that which must be executed successively in an order known in advance, the start and end times of each instruction being precisely known since it is executed in accordance with a predetermined process which, for sophisticated means of analysis, has what may be called a recognizable "signature." It is known that this signature of the process can, for example, be obtained from signals that measure the power consumed by the various electric circuits that are used by the instruction or sequence of instructions executed. It is therefore theoretically possible to know the nature of the instruction sequence that is being executed in the processing unit of the processor at a given moment since the program that is running is constituted by this predetermined sequence of instructions, whose signature is known.

It is possible through such means to determine which particular instruction is being executed, as well as the data used by this instruction.

This capability of being able to observe the details of the execution of a program in a microprocessor or microcomputer is a major drawback when this microprocessor or microcomputer is used in high-security applications. In essence, a malicious individual could thus learn the successive states of the processor and use this information to learn certain sensitive results of internal operations.

It is conceivable, for example, that a given action could occur at different times as a function of the result of a given protected operation, such as the verification of a piece of confidential internal information, the decryption of a message, or the integrity checking of certain information. Depending on the instant in question, one could for example act on the processor, or obtain the value of certain registers through physical analysis, so as to obtain information on the result or on the confidential content of the information, even in the case of cryptographic calculations on the secret encryption key used.

There are known devices that provide a first improvement to protected microcomputers by equipping them with circuits that generate random clock pulses. This way, the analyses make it particularly difficult to observe events, since their synchronization quickly becomes impracticable and the occurrence of an event becomes more difficult to predict.

However, this type of solution has many drawbacks.

First of all, the design of such circuits is particularly delicate and laborious because it is impossible to simulate a random function throughout a circuit as complex as a microcomputer, and even more difficult to test these circuits after production in terms of their scrambled behavior. A random sequence of clock pulses is, in fact, very difficult to simulate for the testing of these circuits, but it is even more difficult to control all the behaviors of the logic circuit assembly of the processor, especially during the switching of signals in the internal busses and in the registers.

There is another known device that introduces a new architecture based on the use of a dummy memory that may be used or not used by the microprocessor in a way that is entirely non-synchronized relative to the external environment. This makes the observation of events and signatures particularly difficult.

However, the use of a random clock or a dummy memory, although it provides some advantageous improvements, does not change the basic behavior of the microprocessor, which is still sequential, even if the instructions that follow one another belong to different processes. Therefore, it is still theoretically possible to "filter out" the bad instructions and save only the good ones, and thus gain access to the information emanating from the microprocessor.

Another drawback resides in the fact that the execution contexts of the programs interrupted by dummy sequences must be saved and restored, which saving requires substantial memory resources.

SUMMARY OF THE INVENTION

One of the objects of the invention is to equip the smart integrated circuit with means that prohibit the type of analysis described above, and more generally prevent any interpretation of the signals issuing from the processor or central processing unit. This type of circuit is called a "MUMIC" (Multi Untraceable MICrocomputer).

This object is achieved through the fact that the smart integrated circuit has a main processor and an operating system executing a main program for constituting a main task-performing process, at least one secondary processor capable of concurrently executing at least one secondary program for constituting at least one task-performing process, power supply circuits common to the processors and means for ensuring that the secondary with similar power and different operating signatures are executed concurrently with the main task performing process by continuously or intermittently inducing, in the power supply circuits, power disturbances that are superimposed on those of the main process so as to produce continuous or intermittent scrambling.

According to another characteristic, the main or secondary processors are each a protected microprocessor or microcomputer.

According to another characteristic, the activation of these means is triggered by the operating system of the main processor (1) of the smart integrated circuit, so that the additional security created by the above means depends only on a decision resulting from the main processor's running of the operating system, located at a place in the integrated circuit inaccessible from the outside.

According to another characteristic, the smart integrated circuit has a main memory dedicated to the main processor, containing the operating system in at least one part of the memory inaccessible from the outside and accessible by at least one of the two processors, and a secondary memory respectively dedicated to the secondary process.

According to another characteristic, the smart integrated has at least one communication bus between the processors, their respective memories and an input/output circuit.

According to another characteristic, the smart integrated circuit is formed by logic circuits dispersed on the substrate or substrates in such a way that the physical layout of the two processors is achieved without any easily recognizable functional blocks, for example by physical interleaving but with a separate logical organization.

According to another characteristic, the secondary processor executes tasks of the secondary process that minimize or cancel out the operating signatures of the main processor.

According to another characteristic, the secondary processor executes tasks of the secondary process correlated to those of the main process executed by the main processor in such a way that the intermediate processing results never appear during the process.

According to another characteristic, the secondary program uses a working space smaller than that of the main program.

A second object of the invention is to make it so that the main process can only run if the secondary process is operational.

This second object is achieved through the fact that the smart integrated circuit has communication means between the main processor and the secondary processor.

According to another characteristic, the communication means between the two processors allow the main processor to know whether or not the secondary processor is operational.

According to another characteristic, the communication means between the two processors allow the main processor to perform an authentication of the secondary processor.

According to another characteristic, the authentication or operational testing of the secondary processor is performed during the processing by the main processor.

According to another characteristic, the means for activating the secondary processor is controlled by the main processor and its main program, by an interrupt system, or by a timer, or even by a combination of the three.

A third object of the invention is to make it so that the secondary process implements a program that is totally different from the main program.

This third object is achieved through the fact that the secondary processor executes tasks of the secondary process that have no correlation to those of the main process executed by the main processor.

According to another characteristic, the secondary processor executes tasks of the secondary process that minimize or cancel out the operating signatures of the main processor.

A fourth object of the invention is for the secondary program to use a program whose signature causes effects different from those emanating from the main processor.

This fourth object is achieved through the fact that the secondary program implements a process correlated to the main process in such a way that the combination of the two processes provides an operating signature of the secondary processor which hides that of the main processor.

According to another characteristic, the secondary processor executes tasks correlated to those of the main processor, in such a way that the intermediate processing results never appear during the process.

A fifth object of the invention is to produce an original architecture using validated circuits, without having to create a new semiconductor technology or new manufacturing processes.

This fifth object is achieved through the fact that the secondary processor can substitute for the main processor and vice versa.

According to another characteristic, the secondary processor executes tasks correlated to those of the main processor by synchronizing the processes and comparing the values of two data elements, each issuing from the respective processor executing its respective program.

According to another characteristic, the secondary processor executes tasks correlated to those of the main processor by logically deducing the secondary program from the main program.

According to another characteristic, the smart integrated circuit comprises at least two processors, and each of the processors has a respective bus to which the RAMs and ROMs for each processor and the nonvolatile memory for the main processor are connected.

According to another characteristic, the smart integrated circuit comprises a plurality of processors, each of which is connected to one and the same multiplexed communication bus between the processors and a RAM, ROM and nonvolatile memory array connected to this bus, the contentions for access to this common bus being handled by an arbitration circuit.

According to another characteristic, the secondary processor executes, successively and in any order, either programs that are correlated or programs without any correlation to those executed by the main processor.

BRIEF DESCRIPTION OF THE DRAWINGS

Other characteristics and advantages of the invention will emerge more clearly in light of the following description, given in reference to the attached drawings in which.

DESCRIPTION OF THE PREFERRED EMBODIMENT(S)

Figure 1:
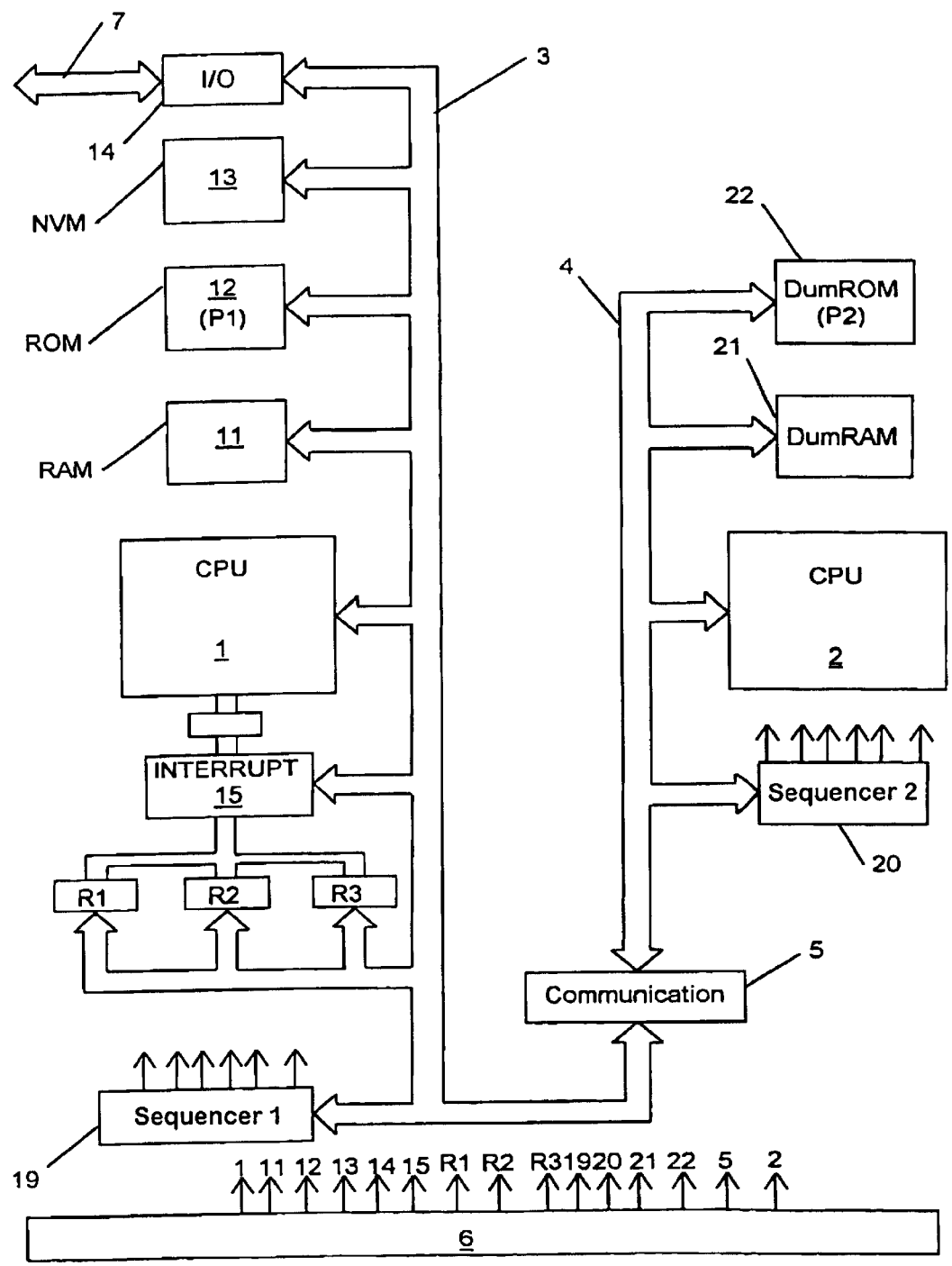
FIG. 1 represents a logic diagram of an embodiment of the integrated circuit of the invention with two processors, each with its bus.

The smart integrated circuit that is the subject of the invention is called a MUMIC (Multi Untraceable MICrocomputer), and a first variant of its logical configuration will be explained in connection with FIG. 1. This logical configuration is not representative of the physical configuration or the topology layout, as will be seen below. This smart integrated circuit is constituted by a main processor (1) and a secondary processor (2), each of the processors being connected by its respective communication (Address, Data and control) bus (3, 4) to respective memories (12, 13, 22) containing the main program (P1) and the secondary program (P2) to be executed by each of the respective main (1) and secondary (2) processors, and working registers such as, for example, volatile RAMs (11, 21). The memories connected to the secondary processor are "dummy" RAMs (DumRAM 21) and ROMs (DumROM 22), which allow the secondary processor (2) to execute tasks that are superimposed on those of the main processor (1). The operating system of the main processor is, for example, contained in a part of the ROM (12) inaccessible from the outside, but accessible by at least one of the two processors. Each processor (1, 2) has its own sequencer (19, 20 respectively). The integrated circuit according to the invention also comprises an input/output circuit (14) connected to the only bus or to the bus of the main processor when the circuit is embodied according to a variant with several busses, and to the outside world, for example by contacts or a contactless linkage device, in order to receive signals from a terminal. A set of registers (R1, R2, R3) and an interrupt circuit (15) can be added to the processor, which needs them to implement one of the variants of operation corresponding to a variant of embodiment described below. The three elements (R1, R2, R3) are connected to an interrupt generating circuit (15), which is connected to the interrupt inputs of the processor (in this case the main processor).

The operating system of the main processor (1) is the only one in the case of a master main processor/slave secondary processor variant and is disposed in the ROM (12) accessible by the main processor. When necessary for the variants in which the processors can exchange roles, a second operating system or the same operating system can be made accessible to the secondary processor, for example through an access right token exchange and a checking of this access right before the processor passes control to the other one. Likewise, an interrupt circuit can be added to each processor that needs one for the role it must play, particularly in the case where roles are exchanged or in the variant of embodiment of FIG. 2a.

The main program (P1) is contained in the nonvolatile memory (13) and the utilization of the dummy memories corresponds to that described in the French patent application published under the number FR 2 765 361, taking into account the fact that there can be execution simultaneity between at least two processors of the smart integrated circuit. In such a case, the two types of memories (dummy and other) are used during the same periods, even if the bus is actually multiplexed.

Figure 5:
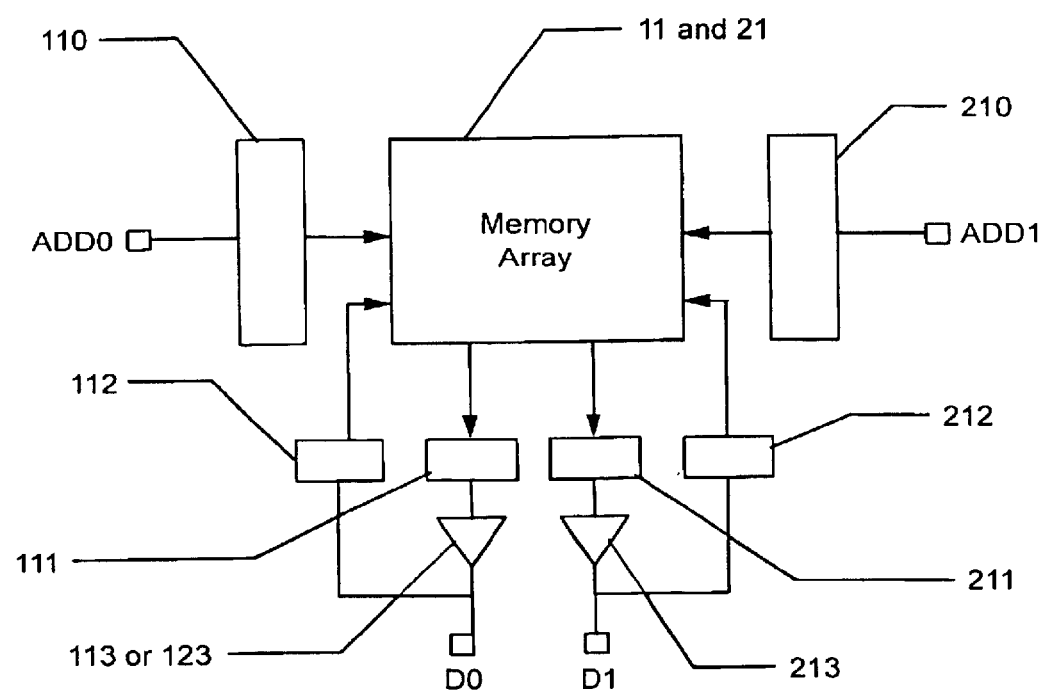
FIG. 5 represents a exemplary embodiment of a dual-port memory accessible through each port by a processor of the circuit.

The integrated circuit also comprises an input/output interface connected to at least one bus of the integrated circuit, which interface can be either parallel-to-parallel or parallel-to-serial. In a variant of embodiment, the working memory RAM (11) of the main processor (1) can be merged with the dummy RAM (21 DumRAM) of the secondary processor (2) to form a single dual-port memory, as represented in FIG. 5. These dual-port RAMs (11-21) use a pair of address registers (110, 210) to receive the address signals (ADD0, ADD1) and to allow access by the main (1) and secondary (2) processor, respectively. These dual-port RAMs (11-21) also use a first pair (111, 211) of data registers to allow data read access by the main (1) and secondary (2) processor, respectively. The outputs of the data registers are connected to amplifiers (113, 213), which deliver the data signals (D0, D1). Finally, these dual-port RAMs (11-21) also use a second pair (112, 212) of data registers to allow data write access by the main (1) and secondary (2) processors, respectively. This type of dual-port memory architecture is available from vendors such as Motorola or Texas Instruments. Synchronous or asynchronous dual-port memories make it possible to read- or write-access a memory address area through two separate channels. They are used, in particular, to control synchronization processes between two separate systems. The use of the dual-port memory to synchronize processes is based on the fact that the processors can access the memory through two independent (address and data) channels, either synchronously or asynchronously, and can share data, which can be used simultaneously.

Figure 7:
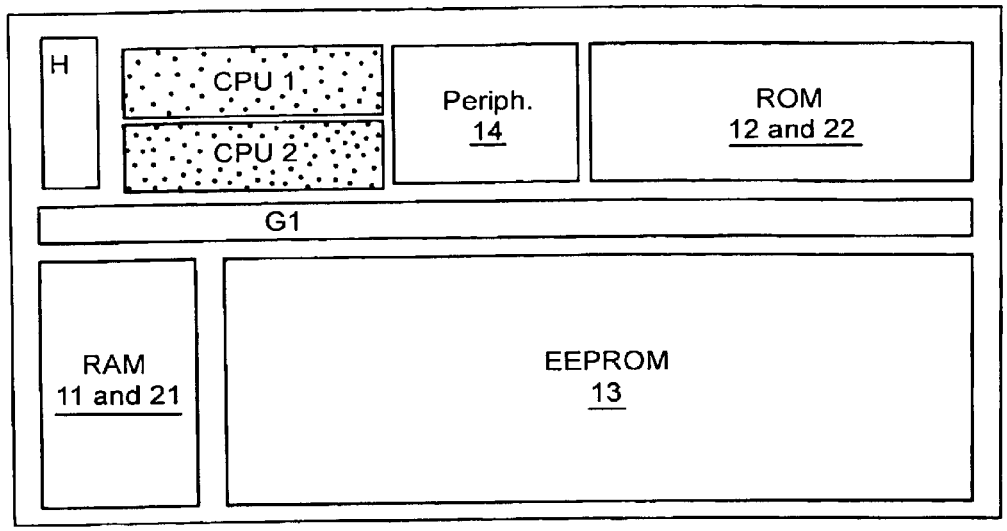
FIG. 7 represents a conventional layout of the elements of a two-processor circuit.
Figure 6:
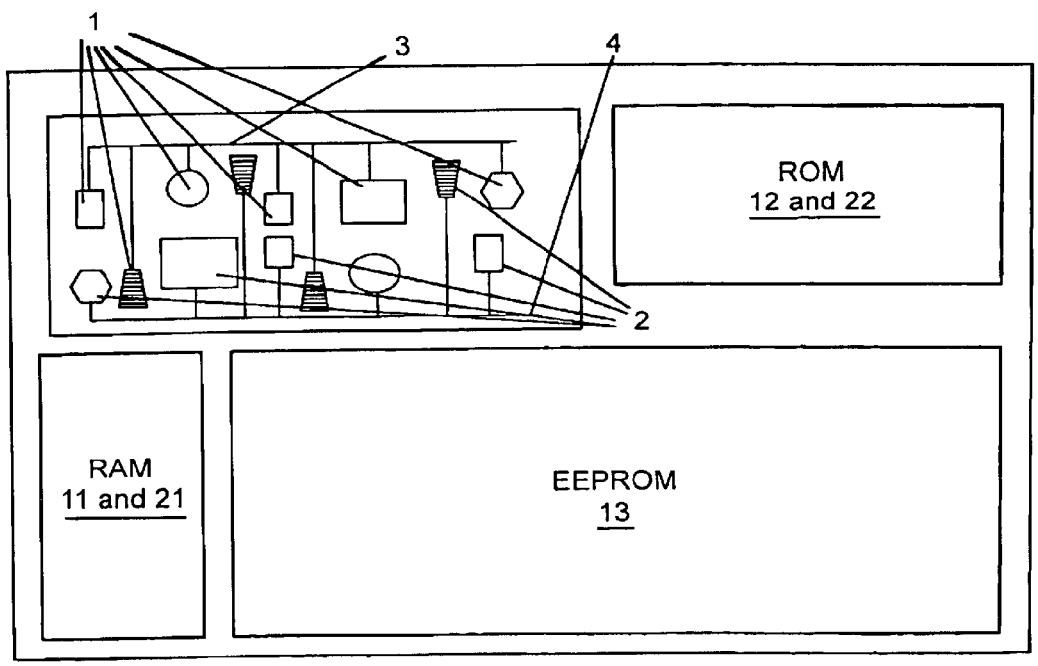
FIG. 6 schematically represents a physical layout of the elements of the circuit according to the invention.

The two processors (1, 2), their busses, (3, 4) and their memories (11, 21; 12, 13, 22) are fed by common power supply circuits (6) in order to reduce the difference between the power usage of one processor and the other as much as possible. With the progress in semiconductor technologies, it is now actually possible to put on the same chip two processors that occupy only a few $mm_2$, and thereby obtain an economically viable solution, the added cost of the second processor being very low, especially when compared to the surface area occupied by the RAMs and programmable nonvolatile memories (NVM). It is suggested that mounting and routing tools that make it possible to merge the processors into a single and unique design block be used. Normally, one skilled in the art who has to mount two processors on the same substrate with RAMs, ROMs and programmable nonvolatile memories will try to find the optimal grouping of the functions as well as the optimum path, and to comply with the timing constraints. This would lead him to adopt an architecture and layout very similar to the one represented in FIG. 7, in which the two processors (CPU1, CPU2) are mounted close to one another, the clock circuit (H) is close to the processors, the peripheral circuits (14) constituting the input/outputs are also adjacent to the processors, and so is what is known in the art as the logical "glue" G1, which is an array of logic elements necessary to the operation of the integrated circuit. The other elements constituting the RAMs (11 and 21), ROMs (12 and 22) and programmable NVMs (13) are disposed around it. One characteristic of the invention resides in the fact that the logical, arithmetical operators, as well as the control functions, are intermixed with one another at the level of the gates or elementary cells, so that the physical location of a cell belonging to a function cannot be determined a priori. Thus, each processor is divided into a certain number of elements, represented by squares or rectangles in FIG. 6. These elements can be installed amid other elements represented by circles and constituting the clock circuits, amid hexagonal elements constituting the logical "glue" or even amid trapezoidal elements constituting the peripheral circuits, or finally amid a combination of these elements, as represented in FIG. 6. The physical layout of the circuits of the two processors is advantageously produced using this type of a completely general topology without any easily recognizable physical functional blocks, as is normally the case. Such a topology is used in "Gate Array" circuits, in which each cell of the matrix can participate in the execution of any function. This way, the two processors (1, 2) can be physically interleaved, despite a separate logical organization, to such a degree that two adjacent transistors can belong to either one of the processors or their associated circuits. This is made possible by the fact that the circuit class to which the field of microprocessor cards relates does not impose high performance in terms of clock cycles. This layout of the circuits is therefore especially conducive to ensuring the security of the assembly. Of course, the production of such circuits requires an automatic computer-assisted layout in order to ensure proper routing of the signals and control of the functionalities. It is understood that the consumptions of the functional blocks are perfectly interleaved and completely mixed.

Figure 2A:
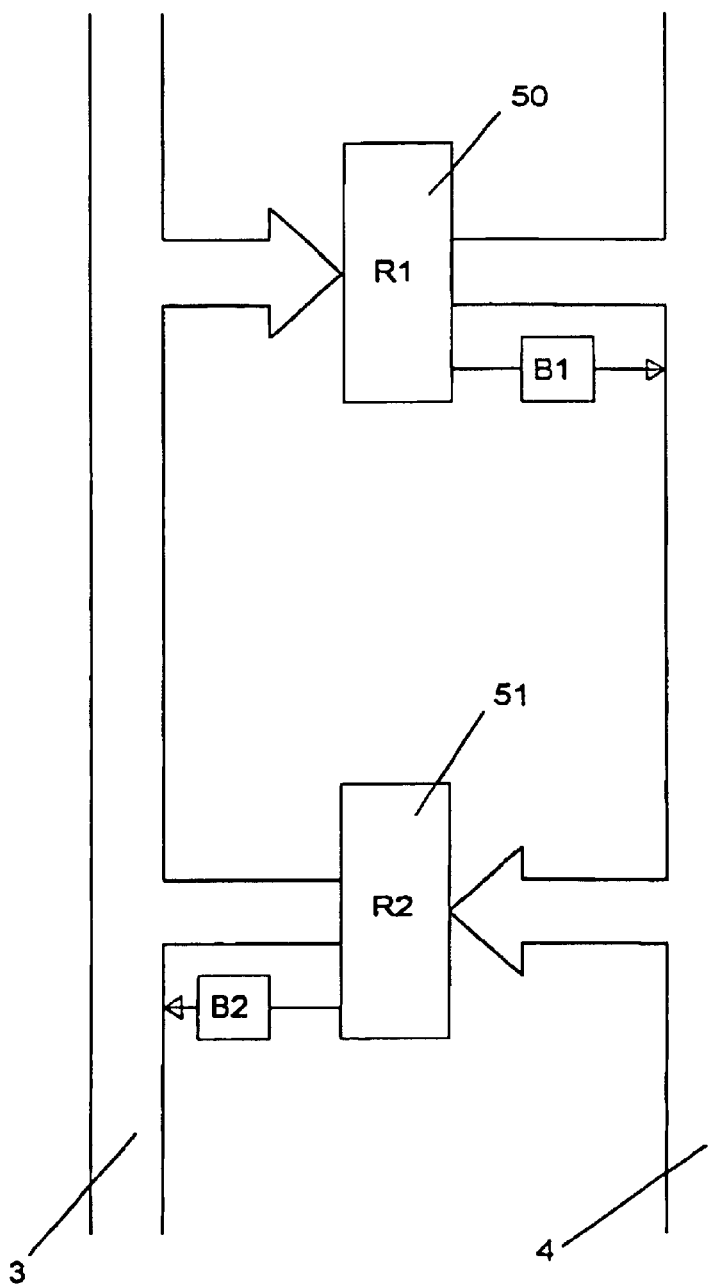
FIG. 2a represents an exemplary embodiment of a communication circuit between two processors of the circuit.
Figure 3:
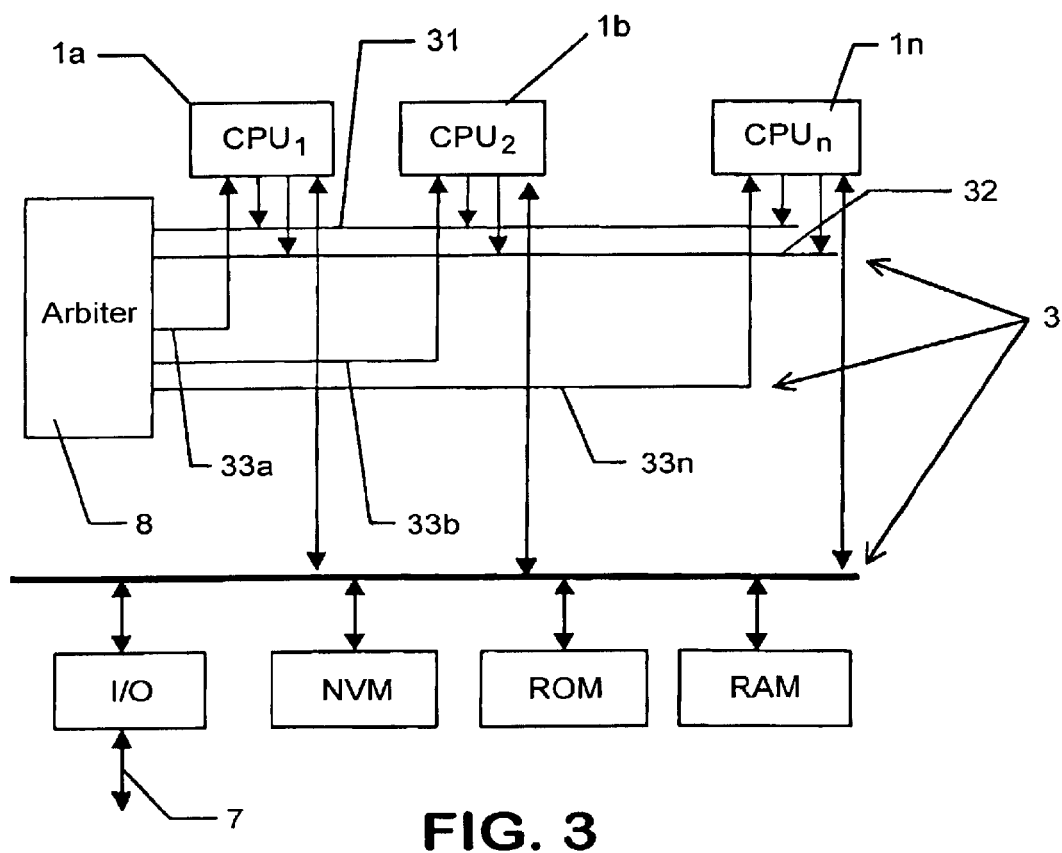
FIG. 3 represents a diagram of an exemplary embodiment of the integrated circuit of the invention with two processors, with only one bus.

Furthermore, the two processors can communicate, either through a specific link, or through a set (50, 51, FIG. 2a) of communication registers connected to the bus (3, 4), or by cycle stealing through the bus of the other processor, or even through an arbitration logic, in the case of a bus shared between the two processors, as represented in FIG. 3.

Figure 2B:
FIG. 2b represents the structure of a frame used in the communication between the two processors of the circuit.

FIG. 2a represents, for example, a link using two registers (50, 51) operating in interrupt mode with the help of detection circuits (B1, B2), but it is also possible to use a dual-access register (5) with a protocol similar to that used in chip cards, i.e., in which the main processor (1) is the master. In the exemplary embodiment according to FIG. 2a, a first register (50) provides the link between the bus (3) of the main processor (1) and that (4) of the second processor (2), while a second register (51) provides the link in the other direction. Each of the respective first (50) and second (51) registers is equipped with a respective first (B1) and second (B2) flip-flop, which moves to the active state when a piece of information has been posted in the corresponding register. The output of the first toggle (B1) is connected to the interrupt system of the secondary processor (2), while that of the second toggle (B2) is connected to the interrupt system of the main processor (1). The size of the registers is large enough to contain the requests and responses from each of the processors. FIG. 2b represents the structure of a frame with a header, a data field and an error detection field. Each frame can constitute either an information block (block I) or an acknowledgement block (block A), each of which blocks can be transmitted in both directions. The header can be constituted by two bytes, the first giving the number of the block and the second its length. When a block is posted in the first register (50), the toggle produces a signal that is interpreted as an interrupt IT1 by the secondary processor (2), thus allowing it to be warned that a message addressed to it is present in the first register (50). The secondary processor (2) can therefore acquire the block by reading the contents of the first register (50), then acknowledge the receipt of the block with an acknowledgement block (block A) posted in the second register (51) addressed to the main processor (1) with the same number. This process is particularly known to allow the chaining of the blocks, although this is not absolutely necessary in the context of this invention. In each information block, the information field may itself be divided into two parts, a control field and a data field. The control field allows the main processor to send instructions to the secondary processor. For example, without limiting the list, there are the following commands: read, write, data check, authentication. When a command is received by the secondary processor (2), the latter acknowledges the receipt of this command with an acknowledgement block (block A) posted in the second register (51) and processes the command in question before posting a response in the second register (51), in the form of an information block (block I). The receipt of this block is acknowledged by the main processor (1) with an acknowledgement block posted in the first register (50), and so on. The numbering of the blocks makes it possible to repeat poorly transmitted or received data blocks. Naturally, the protocol for exchanging information between the main processor and the secondary processor can be used in the opposite direction.

The two programs (P1, P2) are respectively executed in the main (1) and secondary (2) processors in such a way that two instructions are executed simultaneously. It is also possible to phase shift the clock that controls the secondary processor (2) so that the instruction cycles do not exactly correspond in each of the processors. The shifts can also be made variable and random, which produces superimpositions of equally variable instruction cycles. These shifts can be generated by the sequencer (20) of the secondary processor (2).

One advantageous and economic solution consists of using a "dummy" RAM (DumRAM 21) of very small size for the "dummy" memory of the secondary processor (2). In essence, since this memory does not play any real functional role, its addressable space can be limited so that it takes up a minimum amount of space on the chip. This space can correspond, for example, to simply adding one or more lines of RAM to the RAM matrix, this space having its own address and data registers.

The secondary processor (2) can be allowed to run continuously, but it is preferable to use a communication channel between the two processors that can advantageously be used to activate the secondary processor (2) and/or to indicate to the main processor (1) that the secondary processor is operational and/or actually perform tasks. The processors have at least two states: active or inactive. For example, the active state corresponds to the execution of a sequence of diverse operations, and the inactive state can be embodied by a wait loop that does not contain any operation. The passage from one state to another takes place via a communication mechanism between the processors. For example, the main processor can activate an inactive secondary processor by sending it an interrupt. In the variants of embodiment that use the activation mechanism, the processors each have either an interrupt line leading to at least one other processor, or a reset line. In fact, another non-preferred way to cause the passage from the activated state to the deactivated state can consist of maintaining a reset signal sent to the processor that must be deactivated and of suppressing it when the processor moves to the activated state. The activation means are therefore means that allow one processor to move the other from the activated state to the deactivated state and vice versa.

This can be done either by an authentication mechanism between the two processors, or by an activity register test mechanism. The authentication mechanism is triggered at the request of the main processor (1), or periodically, or even randomly. As soon as the main processor (1) detects an abnormality during the authentication, it can stop any operation, or put itself in a wait loop.

To do this, it is possible to use this type of operation in the interrupt mode. When the interrupt is generated, for example, by the abnormality detected at the level of the main processor (1), a dialog is established between the two processors in order to perform an authentication controlled by the main processor (1). This authentication consists, for example, of having the main processor (1) encrypt a data element based on a key stored in a secret area of a programmable nonvolatile memory (13, NVM) connected to the bus (3) of the main processor (1). The encrypted data element is sent to the secondary processor (2) through the communication channel, and the secondary processor decrypts it, then returns the result to the main processor (1), which compares the result of the decryption to the data element. If the result is correct, the main processor (1) can continue to work; if not it enters a wait loop to wait for the next authentication. These mechanisms are known and do not pose any particular problem for one skilled in the art.

The main processor (1) can also test an activity register in the "dummy" RAM (DumRAM, 22) of the secondary processor (2) and determine whether this register has actually changed with each test. If this register has not changed, the main processor can suspend its activity in a way similar to the preceding one.

In a variant, it is possible to use a copy of any part of the main program (P1) as the secondary program (P2), by initially pointing at random to an address and/or by operating on data different from that of the main program. This will ensure that the program executes instructions that are plausible but functionally useless.

It is also possible to have the secondary processor (2) execute a program correlated to the one that is executed by the main processor, in such a way that the intermediate processing results never appear during the execution. Let us assume, for example, that it is necessary to hide the result of an operation F by having each of the processors respectively execute two different functions f1 and f2 of F, chosen in such a way that the result of F can be obtained by a function g that combines these two different functions in such a way that F=g(f1,f2).

In order to avoid introducing errors into the code and/or the data of the card, and also making it possible to perform attacks on the chip card (differential fault analysis, DFA), it is suggested that "fault-intolerant" programs be installed. This introduction of errors is caused, in particular, by instantaneous modifications of the power supply and/or the clock (power/clock glitches). In the example below (a hypothetical communication program), the attacker tries to modify the behavior of the conditional jump (line 3) or the decrement (line 6), in order to receive data outside the storage area normally provided (answer_address+answer_length):

1. b=answer_address
2. a=answer_length
3. if (a==0) goto 8
4. transmit (*b)
5. b=b+1
6 a=a−1
7. goto 3
8 . . .

These "fault-intolerant" programs (i.e., capable of detecting faults) for chip cards, by definition have redundant tasks, which are executed in the processors (CPU) of a multiprocessor card.

At certain "synchronization" points formed by a hardware or software "lock," such as a decremented physical or logical counter, as well as an atomic instruction of the transfer type ("swap," "read-modify-write," known in the prior art), the agreement of the redundant tasks in the execution of the program is verified by the main processor(s).

A discrepancy is considered by the processor that performed the verification as a sign of an attack. The introduction of errors into the code of the card by a hacker becomes much more complicated as a result of these verifications. In the above example, the attacker must succeed in modifying the behavior of two or more tasks in an identical way, which seems practically impossible (impracticable).

In practice, it is desirable to protect the integrity of the "critical" data of the program. For the variables, this protection can be achieved by duplication in memory. Each processor (CPU) then has its own copies of the variables in question, which are stored in a truly functional memory and not a dummy memory. In our hypothetical example, the decrement of the variable "a" (loop counter) can be protected by the instruction sequence below, which is executed by each of the processors:

6 a=a−1
6' SYNCHRONIZATION OF THE PROCESSORS
6" if (a'!=a) goto attack

Where "a'" is a copy of the variable "a" used by the second processor, and in the case where "a" is different from "a'" the program jumps to the so-called "attack" handling routine, which takes the necessary measures to protect the card.

For example, following the detection of an attack, there is a jump to the "attack" label, and the "attack" handling routine will execute the appropriate operations, such as the resetting of the microprocessors and/or the erasure of the keys in programmable nonvolatile memory, for example of the E2PROM type.

It will be noted that it is also possible to directly protect the flow control, i.e., the progress of the program. The protected critical data element in that case is the ordinal counter of the processors (or another piece of information linked to the ordinal counter if the processors are not executing the same code). After each (conditional or unconditional) jump that needs to be protected, the redundant tasks must compare the information in the direction in which the respective jumps have been made. In the hypothetical example given above, the conditional jump in line 3 can then be protected by exchanging and comparing the ordinal counter or the corresponding information in lines 4 and 8.

Figure 4:
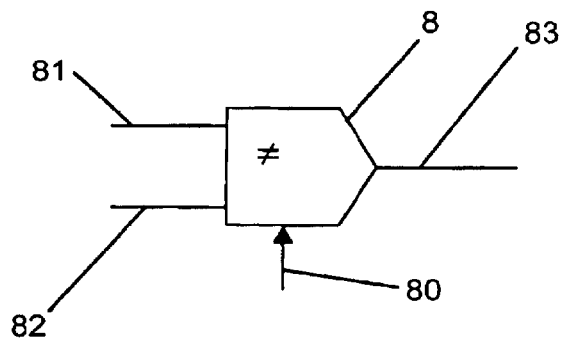
FIG. 4 represents a diagram of an exemplary embodiment of a protection by synchronizing and comparing two values of data elements issuing from each processor.

The exchange and comparison operations can be performed either via software means (in a way similar to the instruction sequence 6–6" described above), or via hardware means by a comparator (8) like that in FIG. 4, which is activated by a signal resulting from the synchronization operation and delivered to its validation input (80). The comparator (8) also receives through its other inputs (81, 82) the signals representing the values of the ordinal counters (PC, PC') related to each main (1) and secondary (2) processor In case of attack, the hardware comparator (8), using the signal (attack interrupt) sent through its output (83), triggers the processing of an interrupt, which then performs the appropriate operations through the interrupt mechanism of the microprocessors (example: Reset interrupt).

One might be tempted to say that these mechanisms are similar to the conventional execution of programs in a two-processor system, but the mechanisms of the invention are very different:

The two processors are fed by the same circuits, in order to mix up the various instantaneous consumptions of the two processors and their associated circuits. They can be located on the same silicon substrate.

The signatures of the instructions used in the secondary processor are capable of concealing the effect of the signatures of the instructions executed in the main processor.

The purpose of the secondary program is to execute functions that are different from the main program but that hide those of the main program. It is also possible to consider a secondary process that executes tasks without any correlation to the main program, or even incoherent tasks, or conversely, to have it perform tasks parallel to the main process that are correlated to the latter, for the purpose of hiding them.

The size of the "dummy" RAM can often be much smaller than the one required for the normal running of a program.

The main processor will only execute a program that is sensitive in terms of security if the secondary processor is authenticated and/or if it is active.

The content of the "dummy" RAM is of no functional importance, since it is used only to scramble the traces of the power consumption in the memory array.

It is not necessary to save and restore the contexts of the secondary programs.

In another variant of embodiment, the main processor (1) activates a timer (R3) initialized either by means of the random generator (R1) or from the content of the programmable nonvolatile memory (13, NVM). This programmable nonvolatile memory (13) can actually contain a unique number modified with each use. When the timer (R3) runs out at the end of a period that cannot be predicted from the outside, it triggers an authentication of the secondary processor (2) by the main processor (1).

In another variant of embodiment, the register (R2), after having been loaded with particular information (for example coming from a memory or from the random generator (R1)), can be used to trigger an interrupt.

In another variant of embodiment, a random generator (R1) is connected to the interrupt system (15) of the main microprocessor (1) in order to generate interrupts that are irregular and completely non-synchronized relative to the execution of the programs in the main processor (1). Of course, the interrupt system may or may not be maskable, depending on the process in question. In this case, if the interrupt is masked, the operation of the assembly is conventional, in the single-processor mode, but as soon as the current main program (P1) wants to protect itself against possible observation, it authorizes this interrupt, which triggers the authentication and activation of the secondary processor (2).

In another variant of embodiment with a common bus shared between at least two processors, for example n processors, each processor (1a, 1b, . . . 1n, FIG. 3) is connected to a centralized arbitration logic (8) by three types of lines, a first bus request line (31), a second bus busy line (32), and a third bus polling line (33) of the common bus (3). The first two types, request (31) and busy (32) are respectively constituted by a single line common to all the processors, while the last type, polling (33), is an individual line (33a, 33b, . . . 33n) to each of the n processors (1a, 1b, . . . 2n). All of the processors share through the single bus (3) the RAM, the ROM, the programmable nonvolatile memory (NVM), and the input/output circuit (I/O).

A processor (for example 1a) that wants to acquire the bus (3) indicates this desire through the bus request line (31). The arbiter (8) interrogates the other processors (1b, . . . , 1n) in accordance with a properly determined algorithm (example, cyclic interrogation, bus polling) through the polling type lines (33b, . . . , 33n) corresponding to the interrogated processors. The first interrogated processor that demanded it acquires the bus and activates the bus busy line (32). The arbiter (8) only resumes the interrogation once the bus (3) is released by the passage of the signal transmitted through the bus busy line (32) from the active state to the inactive state. It is understood that the processors are connected to one and the same bus, to which they share access by time division multiplexing these accesses.

Of course, it is possible to combine the effects of the preceding embodiments, and it is not necessary for the scrambling to be done continuously.

Thus, when the main program (P1) executes functions that are not sensitive in terms of security, the scrambling produced by the invention can be made intermittent by intermittently reverting to single-processor operation, for example in order to deliver results to the outside world, for testing purposes, or even to mask the interrupts of the timer (R3) or the random generator. As soon as a protected function is implemented, the main program (P1) authorizes the operation of the secondary processor (2) in order to "scramble" the operation.

In fact, the security no longer results from the fact that the processor is randomly timed as in the prior art, but is produced by the simultaneous execution of two programs (P1, P2) with different signatures by two processors (1, 2) fed by the same power sources.

The organization of the programs executed by the main processor (1) can be done in such a way that the operation of the main processor is controlled by a truly secure operating system, which decides on the type of scrambling to be used based on the type of program executed by the machine. In this case, it is the operating system of the main processor (1) that handles the various control signals from the secondary processor (2) as it sees fit. It is also clear that the secondary program (P2) can be used to perform functions useful to the main program (P1), including operations that can accelerate the global processing time. These operations can be constituted, for example, by preparations of calculations performed by the secondary program but ultimately used by the main program (P1). Of course, it is easy to generalize the mechanisms of the invention when the processor is operating in the multiprogram mode, in which case the application programs can be considered as main programs.

The random generator and the timer seen above do not pose any particular production problems and are known to one skilled in the art when they are used separately for other uses that are not tied to the invention.

In another variant, it is possible to embody the invention in such a way that the two processors can alternately play the role of main processor and secondary processor. This assumes that a priority token is exchanged between the two processors in order to confer the role of master on either of the two processors at a given time.

Other modifications are also part of the spirit of the invention. The variants described with an embodiment limited to two processors can also apply to embodiments with several processors and are part of the invention. Thus, at any point in the specification the term ROM should be understood to be a ROM, but could also be replaced by a PROM, EPROM, EEPROM or any other type of programmable nonvolatile memory, ROM or RAM.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A smart integrated circuit, comprising a main processor (1) and an operating system executing a main program (P1) for constituting a main task-performing process, at least one secondary processor (2) capable of concurrently executing at least one secondary program (P2) for constituting at least one task-performing process, power supply circuits (6) common to the processors and means for activating the secondary processor to ensure that the secondary processor or processors with similar power and different operating signatures are executed concurrently with the main process by continuously or intermittently inducing, in the power supply circuits, power disturbances that are superimposed on those of the main task performing process so as to produce a continuous or intermittent scrambling.

2. A smart integrated circuit according to claim 1, characterized in that the main or secondary processors are each a protected microprocessor or microcomputer.

3. A smart integrated circuit according to claim 1, characterized in that the activation of said means is triggered by the operating system of the main processor (1) of the smart integrated circuit, so that said means for activating the secondary processor creates additional security that depends only on a decision resulting from the main processor's running of the operating system located at a place in the integrated circuit inaccessible from the outside.

4. A smart integrated circuit according to claim 1, characterized in that it includes a main memory (12, 13) dedicated to the main processor (1), the operating system being contained in at least one part of the memory, said one part of the memory being externally inaccessible but accessible by at least one of the main or secondary processors (1, 2) and a secondary memory (21, 22) respectively dedicated to the secondary processor (2).

5. A smart integrated circuit according to claim 1, characterized in that it includes at least one communication bus (3, 4) between the main and secondary processors, their respective memories, and an input/output circuit.

6. A smart integrated circuit according to claim 1, characterized in that it includes logic circuits dispersed on a substrate or substrates, such that a physical layout of the main and secondary processors is achieved without any easily recognizable functional blocks.

7. A smart card as set forth in claim 6, wherein the physical layout comprises a physical interleaving of the main and secondary processors, but with a separate logical organization.

8. A smart integrated circuit according to claim 1, characterized in that the secondary processor (2) executes tasks of the secondary process that minimize or cancel out operating signatures of the main processor (1).

9. A smart integrated circuit according to claim 1, characterized in that the secondary processor (2) executes tasks of the secondary process correlated to those of the main process executed by the main processor (1) in such a way that the intermediate processing results never appear during the process.

10. A smart integrated circuit according to claim 1, characterized in that the secondary program (P2) has a usable working space smaller than that of the main program (P1).

11. A smart integrated circuit according to claim 1, further comprising communication means between the main processor (1) and the secondary processor (2).

12. A smart integrated circuit according to claim 11, characterized in that the communication means (50, 51, B1, B2) between the main and secondary processors allow the main processor (1) to know whether or not the secondary processor (2) is operational.

13. A smart integrated circuit according to claim 11, characterized in that the communication means between the two processors allow the main processor (1) to perform an authentication of the secondary processor (2).

14. A smart integrated circuit according to claim 11, characterized in that an authentication or operational testing of the secondary processor (2) is performed during the processing by the main processor (1).

15. A smart integrated circuit according to claim 14, characterized in that an authentication or operational testing of the secondary processor (2) is performed during the processing by the main processor (1).

16. A smart integrated circuit according to claim 1, characterized in that the means for activating the secondary processor (2) is controlled by the main processor (1) and its main program (P1), by an interrupt system (15) or by a timer (R3), or a combination of the three.

17. A smart integrated circuit according to claim 1, characterized in that the secondary processor (2) executes tasks of the secondary process with no correlation to those of the main process executed by the main processor (1).

18. A smart integrated circuit according to claim 1, characterized in that the secondary processor (2) executes tasks of the secondary process that minimize or cancel out the operating signatures of the main processor (1).

19. A smart integrated circuit according to claim 1, characterized in that the secondary program (P2) implements a process correlated to the main process, such that the combination of the two processes provides an operating signature of the secondary processor (2) which hides an operating signature of the main processor(1).

20. A smart integrated circuit according to claim 1, characterized in that the secondary processor (2) executes tasks correlated to those of the main processor (1) in such a way that the intermediate processing results never appear during the process.

21. A smart integrated circuit according to claim 1, characterized in that the secondary processor (2) can substitute for the main processor (1) and vice versa.

22. A smart integrated circuit according to claim 1, characterized in that the secondary processor (2) executes tasks correlated to those of the main processor (1) by synchronizing the processes and comparing the values of two data elements, each issuing from the respective processor executing its respective program.

23. A smart integrated circuit according to claim 1, characterized in that the secondary processor (2) executes tasks correlated to those of the main processor (1) by logically deducing the secondary program (P2) from the main program (P1).

24. A smart integrated circuit according to claim 1, characterized in that each of the main and secondary processors (1, 2) has a respective bus (3, 4) to which RAMs and ROMs for each processor and a nonvolatile memory for the main processor are connected.

25. A smart integrated circuit according to claim 1, characterized in that each of the processors is connected to one and the same multiplexed communication bus between the processors and a RAM, ROM and nonvolatile memory array connected to said bus, and further including an arbitration circuit (8) for managing the contentions for access to said common bus.

26. A smart integrated circuit according to claim 1, characterized in that the secondary processor (2) executes, successively and in any order, either programs that are correlated or programs without any correlation to those executed by the main processor (1).

* * * * *